United States Patent
Burgess

(12) 
(10) Patent No.: US 6,723,369 B2
(45) Date of Patent: Apr. 20, 2004

(54) CARBONATED BEVERAGE FOR STRENGTHENING ACID RESISTANCY OF TEETH

(75) Inventor: James Micheal Burgess, Lincoln, RI (US)

(73) Assignee: James M. Burgess, Lincoln, RI (US)

( * ) Notice: Subject to any disclaimer, the term of this patent is extended or adjusted under 35 U.S.C. 154(b) by 389 days.

(21) Appl. No.: 09/884,899

(22) Filed: Jun. 20, 2001

(65) Prior Publication Data

US 2002/0034576 A1 Mar. 21, 2002

Related U.S. Application Data

(63) Continuation-in-part of application No. 09/577,818, filed on May 25, 2000.
(60) Provisional application No. 60/136,307, filed on May 27, 1999.

(51) Int. Cl.[7] .................................................. A23F 3/00
(52) U.S. Cl. ....................................... 426/597; 426/477
(58) Field of Search .................................. 426/597, 477

(56) References Cited

U.S. PATENT DOCUMENTS 4,946,701 A * 8/1990 Tsai et al.
5,780,086 A * 7/1998 Kirksey et al.

FOREIGN PATENT DOCUMENTS

| GB | 1500067 | * | 2/1978 |
| JP | 01256345 | * | 10/1989 |
| JP | 03-108445 | * | 5/1991 |
| JP | 08-66171 | * | 3/1996 |

OTHER PUBLICATIONS

University Of California at Berkeley Wellness Letter. vol. 14, Issue 3. Dec. 1997. pp. 1 and 2.*
Kharebava et al. Derwent Abstract. Access No. 1982–34701E. For SU 839475, Abstract published 1982.*

* cited by examiner

Primary Examiner—Anthony J. Weier

(57) ABSTRACT

This invention relates to a storage-stable carbonated beverage that will provide fluoride and polyphenols of tea to the population to strengthen the acid resistancy of teeth. The beverage contains of water, carbon dioxide, tea and sweetener.

21 Claims, No Drawings

CARBONATED BEVERAGE FOR STRENGTHENING ACID RESISTANCY OF TEETH

This application is a continuation-in-part of U.S. application Ser. No. 09/577,818, filed May 25, 2000 which claims benefit of 60/136,307 filed May 27, 1999.

BACKGROUND OF THE INVENTION

1. Field of the Invention

The invention relates to beverage products, and in particular relates to carbonated beverages containing tea.

2. Description of the Prior Art

Due to the recently discovered benefits of tea polyphenols, tea has emerged to be a growing product, but it has it limitations, that is, the younger population is not consuming the product as they would consume soft drinks. Soft drinks are consumed in large quantities but offer no benefits to the individual other then to quench one's thirst.

Due to the recent demand for bottled water that doesn't contain fluoride and filtration systems that filters out the fluoride that is added, the younger population is not getting the required fluoride to keep one's teeth healthy. This invention would allow all of the healthy benefits of tea including fluoride and polyphenols that are in tea to be consumed as a soft drink. It is desirable for consumer to have available a carbonated beverage having the advantages of tea.

As stated in the University of California at Berkeley Wellness Letter all forms of tea being black, oolong and green are made form the leaf of the *Camellia sinenis,* like all greens, contain a variety of complex chemicals beneficial to humans. One cup of black tea contains enough fluoride to help prevent tooth decay, and green tea has twice as much. Tea contains about 40 milligrams per cup of caffeine. Tea contains phytochemicals known as polyphenols. At least half of these act as antioxidants.

Green tea, in fact, contains large quantities of polyphenols, plus other potentially beneficial phytochemicals. A cup of tea brew contains 300 to 400 milligrams of polyphenols, and they constitute from 8 to 12% of the dried weight of green tea. One of these polyphenols, known as EGCG, is found in no other plant, and constitutes half of all green tea polyphenols and it is one of the most potent antioxidants yet discovered. Black tea is less potent, but still has some polyphenols and possibly its own form of beneficial substances.

It is known that tea contains 300–2000 ppm of fluoride of which more than 50% is present in the tea extract. In a comparison to a case of not drinking tea, a case of drinking tea has been found to be preventive in the development of tooth decay and this has been reported to be due to the presence of fluoride in tea.

As stated in U.S. Pat. No. 3,845,220 coffee carbonated beverage contains an enzymatically-treated coffee liquid and a suitable amount of carbonated water. In an experiment between the coffee, tea and root beer, the coffee produced the most foam with the tea second the root beer third. Because the inventor wants to keep the product as healthy and natural as possible the use of enzymatic treatment to reduce the foam has been eliminated.

Again as stated in U.S. Pat. No. 4732773 instant beverage, instant tea, instant tea beverage, instant fruit tea, and instant fruit tea beverage in the form of a powder, granules or paste are prepared by using a protein as a carrier in which protein is dispersible and/or soluble in a liquid. Because of the protein addition as stated in the above patent the product with added carbonation would foam making it impractical to carbonate. In addition the product doesn't offer it as decaffeinated which would be a healthier option for babies and infants.

Disclosed in U.S. Pat. No. 5,470,565 composition for strengthening acid resistancy of teeth. This invention is in the form of a toothpaste, tooth powder or a mouthwash that uses at least one tea polyphenol, fluoride and aluminum salt in a concentrate to strengthen the acid resistance of teeth but does not offer it in a drink or more specifically a carbonated drink. The aluminum salt was omitted in this present invention do to the adverse affect it would have on the taste of the invention.

In addition, due to the fact that carbonated soft drinks are extremely popular but lack the beneficial health benefits; an improved healthier soft drink with fluoride and polyphenols would be beneficial.

In view of these circumstances, in order to realize greater consumption of like beverages, the present inventor conducted repeated research with the intention of uniting tea with its beneficial properties and carbonated drinks. As a result, the carbonated beverage, according to the present invention in which tea with its fluoride and polyphenols is mixed with carbonated water has been finally accomplished. Up until now the possibility to provide a carbonated beverage containing tea to strengthen the acid resistance of teeth has not been put to practical use.

It is therefore an object of the present invention to provide a carbonated beverage containing tea.

It is a further object of the present invention to provide a carbonated beverage, which contains the benefits of strengthing the acid resistancy of teeth.

These and other objects of the invention will become obvious from the following descriptions and examples.

SUMMARY OF THE INVENTION

This invention relates to a storage-stable carbonated beverage that will provide fluoride and polyphenols of tea to the population to strengthen the acid resistance of teeth. The beverage is comprised of water, carbon dioxide, tea and sweetener.

DETAILED DESCRIPTION OF THE INVENTION

This invention comes up with a way to provide a carbonated beverage containing fluoride and polyphenols. The invention proposes a way to provide carbonated beverage containing fluoride and polyphenols to the general public by using tea extraction that contains the fluoride and polyphenols as disclosed in U.S. Pat. No. 5,470,565. The tea extract containing the fluoride and polyphenols now can be used to make a syrup consisting of a sweetener and carbonated water to produce carbonated beverage.

This product contains tea extracts, sweetener, purified water and carbonation (CO2).

Water, the major ingredient in soft drinks, is the vehicle or liquid portion in which the remaining ingredients are dissolved or dispersed. Purified water is used in the manufacturing of soft drinks and in the beverage of the present invention. In order not to adversely affect beverage taste, odor or appearance, standard beverage quality water is required. The water must be clear, colorless, and low in alkalinity, free from objectionable minerals, odors, taste and organic matter and of acceptable microbiological quality based on the industry and governmental standards. Water is present in the beverage at a level of from 65% to 99.9% weight of the beverage.

Natural crystalline or liquid sweeteners such as sucrose, glucose levulose, invert sugar, fructose, high fructose corn syrup and others can be used. To achieve the desired beverage uniformity, texture, and taste, standard liquid sugars, as are commonly employed in the beverage industry can be used. Artificial or non-nutritive sweeteners are also suitable for use in the present invention such sweeteners include saccharin, cyclamate, aspartame, other dipeptides, acesulfame potassium and others. Natural sweeteners are present in an amount of about 0.001% to 30% by weight of the beverage. Non-natural sweeteners are added in milligrams per fluid ounces and according to sweetening power.

Tea is extracted from tea leaves from the plant *Camellia sinenis* in water at a temperature of 90 to 93 degrees C. The tea extract can be evaporated to reduce the water content to about half to form a concentrate extract. The tea extract can also be put through a spray drying process, which consists of dispersion of the concentrate into very fine droplets. The droplets are mixed with a stream of hot air, which quickly evaporates the water forming dry tea particles, than separation of the tea from the air. The tea extract contains 100–2000 ppm of fluoride and 10–2000 ppm of polyphenols. The tea polyphenols may be in the form of tea catechins or theaflavins. Tea polyphenols contain catechin, C(+); epicatechin, EC(−); gallocatechin, GC(+); epigallocatechin EGC(−); epicatechin gallate, Ecg(−); gallocatechin gallate GCg(−); epigallocatechin gallate EGCg(−). Tea extract is present in the amount of 0.001% to 30%. The tea extract can also contain natural and artificial color.

Carbon dioxide provides effervescence to the beverage of the present invention. Any type of carbonation equipment can be used. Carbon dioxide enhances the beverage taste and appearance and aids in the safeguarding of the beverage purity and improve the acid resistancy of teeth by inhibiting and destroying bacteria by reducing the oxygen in the product, container it is stored in, and on and around the teeth. Since there is a definite relationship between taste and carbonation, it is important to maintain the carbonation within the desired range. The beverage of the present invention has a carbon dioxide level from about 0.5 to 17 volumes of carbon dioxide. One volume of carbon dioxide is defined as the amount of carbon dioxide absorbed by any given quantity of water at 60 degrees F. temperature and atmospheric pressure. A volume of gas occupies the same space, as does the water by which it is absorbed.

Acid is used in carbonated beverages to add tartness and act as a mild preservative. Acids that can be used in the present invention are phosphoric, citric, malic, tartaric, lactic, formic, ascorbic, hydrochloric, sulfuric, fumaric and adipic. Carbonation itself adds acid to the beverage. The acid used in solution form can be in the amount of 0% to 0.5% by weight. Benzoic acid, sodium benzoate or other suitable compounds can be added as a preservative. Caffeine can be eliminated from this product. Flavors can vary depending on what tea is used. Minor ingredients can be reasonably altered or eliminated without departing from the scope of this invention.

Fluoride can be naturally found in tea in the amount of 100–2000ppm. Fluoride also can be added in the form of Sodium Fluoride (NaF), Calcium Fluoride (CaF), Fuorsilicic acid (H2SiF6), Fluorine (F) or other fluorides. Fluoride exists as a fluoroapatite in the enamel of teeth, and it is well known that it strengthens the acid resistancy of the enamel to reduce cavities. Fluoride is present in the amount of 0.0001% to 5%.

EXAMPLE 1

A beverage was prepared according to the following formula:

| Ingredients | % by weight |
| --- | --- |
| Carbonated Water | 84.03 |
| Black Tea Extract | 00.25 |
| Sugar | 10.55 |
| Filtered Water | 05.17 |

The beverage was prepared by adding 0.7 grams of instant tea extract containing the fluoride and polyphenols with ½ oz. of filtered water. 1 oz. of sugar is then added to the mixture of tea and filtered water. The mixture is heated to 100 degrees F. for 30 seconds and mixed producing a syrup mixture. The syrup mixture is then allowed to cool for three hours and any scum on the surface is removed. The cooled syrup is added to a 12-oz bottle. Carbonated water is added in the amount of 8.43 ounces to the bottle with the specific weight being 63.43 pound / cubic feet at 40 degrees F. and the cap is put on. The bottle is then turned upside down several times mixing the syrup with the carbonated water. The result was a carbonated beverage for strengthening the acid resistancy of teeth.

EXAMPLE 2

A beverage was prepared according to the following formula:

| Ingredients | % by weight |
| --- | --- |
| Carbonated Water | 93.58 |
| Black Tea Extract | 00.27 |
| Aspartame | 00.39 |
| Filtered Water | 05.76 |

The beverage was prepared by adding 0.7 grams of instant tea extract containing fluoride and polyphenols with ½ oz. of filtered water. 1 gram of aspartame is then added to the mixture of tea and filtered water producing a syrup. The syrup is added to a 12-oz bottle. Carbonated water is added in the amount of 8.43 ounces to the bottle with the specific weight being 63.43 pound/cubic feet at 40 degrees F. and the cap is put on. The bottle is then turned upside down several times mixing the syrup with the carbonated water. The result was a carbonated beverage for strengthening the acid resistancy of teeth.

EXAMPLE 3

A beverage was prepared according to the following formula:

| Ingredients | % by weight |
| --- | --- |
| Carbonated Water | 70.50 |
| Black Tea Extract | 00.34 |

-continued

| Ingredients | % by weight |
|---|---|
| High Fructose Corn Syrup | 25.09 |
| Filtered Water | 04.07 |

The beverage was prepared by adding 0.7 grams of instant tea extract fluoride and polyphenols with ½ oz. of filtered water. 3 oz. of high fructose corn syrup is then added to the mixture of tea and filtered water producing a syrup. The syrup is added to a 12-oz bottle. Carbonated water is added in the amount of 8.43 ounces to the bottle with the specific weight being 63.43 pound/cubic feet at 40 degrees F. and the cap is put on. The bottle is then turned upside down several times mixing the syrup with the carbonated water. The result was a carbonated beverage for strengthening the acid resistancy of teeth.

EXAMPLE 4

Same as Example 1 except using green tea, oolong tea, decaffeinated black tea, decaffeinated green tea, decaffeinated oolong tea and decaffeinated black tea.

EXAMPLE 5

Same as Example 2 except using green tea, oolong tea, decaffeinated black tea, decaffeinated green tea, decaffeinated oolong tea and decaffeinated black tea.

EXAMPLE 6

Same as Example 3 except using green tea, oolong tea, decaffeinated black tea, decaffeinated green tea, decaffeinated oolong tea and decaffeinated black tea.

What I claim as my invention is:

1. A method wherein a beverage was produced by the following steps of:
   a) creating a mixture by combining water and tea extract, said tea extract produced from green, oolong or black tea from the plant *Camellia sinensis;* 0.001%–40% by weight of a sweetener, and optionally one or more of a preservative, fluoride, foam reducer, flavor, herbs, caffeine, spices, nutrients and coloring;
   b) heating the mixture to produce a syrup mixture or mixing at room temperature to produce a syrup mixture;
   c) removing any scum from the surface of the syrup mixture, if it is present;
   d) placing the syrup mixture in a bottle;
   e) adding 0.5–23 volumes of carbon dioxide to a second amount of water to form carbonated water wherein same is effective to carbonate the beverage subsequently produced and in an amount to aid in safeguarding purity of the beverage and destroy bacteria by reducing the oxygen therein; and
   f) shaking or turning the bottle upside down several times to mix the syrup with the carbonated water,
      wherein the beverage resulting from these steps contains 65%–99.9% by weight water and 0.001%–30% by weight tea extract and wherein said beverage also contains fluoride and polyphenols in an amount effective for strengthening acid resistance of teeth such that fluoride is present in an amount of 10–2000 ppm or 0.0001% to 5% by weight and tea polyphenols are present in an amount of 10–3000 ppm.

2. A method wherein a beverage was produced by the following steps of:
   a) creating a mixture by combining 0.01 to 4.1 grams or 0.0156 to 0.4 fluid ounces of tea extract containing fluoride and polyphenols with 0.1 to 6 fluid ounces of filtered water; a sweetener wherein said sweetener is 0.01 to 4 ounces or 0.02 to 6 fluid ounces of a natural sweetener or said sweetener is 0.001–8.1 grams or 0.001–6 fluid ounces of a non-nutritive sweetener;
   b) heating the mixture to produce a syrup mixture or mixing at room temperature to produce a syrup mixture;
   c) removing any scum from the surface of the syrup mixture, if it is present;
   d) placing the syrup mixture in a bottle;
   e) adding 0.5–23 volumes of carbon dioxide to 6–11.9 fluid ounces of a second amount of water form carbonated water wherein same is effective to carbonate the beverage subsequently produced and in an amount to aid in safeguarding purity of the beverage and destroy bacteria by reducing the oxygen therein; and
   f) shaking or turning the bottle upside down several times to mix the syrup with the carbonated water,
      wherein the beverage resulting from these steps contains 65%–99.9% by weight water and 0.001%–30% by weight tea extract and wherein said beverage also contains fluoride and polyphenols in an amount effective for strengthening acid resistance of teeth such that fluoride is present in an amount of 10–2000 ppm or 0.0001%–5% by weight and tea polyphenols are present in an amount of 10–3000 ppm.

3. A storage stable carbonated beverage composition used for strengthening acid resistancy of teeth consisting essentially of about 65% to about 99.99% by weight of water; about 0.001% to about 30% by weight of tea extract containing fluoride and polyphenols in an amount effective for strengthening acid resistance of teeth wherein said tea extract is a black or oolong tea extract and the fluoride is present in an amount of 10–2000 ppm or 0.0001% to 5% by weight and the tea polyphenols are present in an amount of 10–3000 ppm, an amount of sweetener effective to impart sweetening to the carbonated beverage, an edible acid or combination of edible acids at a level of from about 0.01% to about 0.5% by weight of the beverage composition and wherein the pH of said beverage is from about 2 to about 8; carbon dioxide in an amount effective to carbonate said beverage composition and to aid in safeguarding purity of the beverage composition and destroy bacteria by reducing the oxygen therein; and, optionally, at least one agent from the group consisting of natural or artificial flavoring, caffeine, nutrients, foam reducers, natural or artificial coloring, preservatives, herbs, and spices and wherein said tea extract is prepared by a process of extracting tea leaves from the plant *Camellia sinenis* wherein the extracted product of same is then either evaporated to produce a tea extract in the form of a concentrate extract or to produce a tea extract that is in the form of dry tea particles, and wherein the tea beverage is formed by a process consisting essentially of the steps of adding said extract which in the form of said concentrate extract or said dry tea particles with other ingredients, optionally heating same and cooling same, adding carbonated water, and mixing same.

4. The beverage as in claim 3 wherein said tea extract is black tea.

5. The beverage as in claim 3 wherein said tea extract is decaffeinated black tea.

6. The beverage as in claim 3 wherein said tea extract is oolong tea.

7. The beverage as in claim 3 wherein said tea extract is decaffeinated oolong tea.

8. The beverage as in claim 3 wherein the sweetener is a natural sweetener or a non-nutritive sweetener.

9. The beverage of claim 8 wherein the sweetener is a natural sweetener present in the amount of from about 0.01% to about 40% by weight.

10. The beverage of claim 8 wherein the sweetener is a non-nutritive sweetener present in the amount of from about 0.001% to about 25% by weight.

11. The beverage of claim 10 wherein the non-nutritive sweetener is selected from the group consisting of saccharin, cyclamate, aspartame, other dipeptides, and acesulfame potassium.

12. The beverage as in claim 3 wherein the edible acid is selected from the group consisting of phosphoric, citric, malic, tartaric, lactic, formic, ascorbic, isoascorbic, hydrochloric, sulfuric, fumaric, and adipic.

13. The beverage of claim 12 wherein the edible acid is citric acid provided as lemon or lime juice.

14. The beverage as in claim 3 is carbonated to a level of from about 0.5 to about 23 volumes of carbon dioxide.

15. The method as in either one of claim 1 or claim 2 further comprises of a natural sweetener or a non-nutritive sweetener.

16. The method as in claim 2 wherein the tea extract is from the plant *Camellia sinensis*.

17. The beverage as in claim 3 wherein the fluoride is in a form selected from the group consisting of sodium fluoride, calcium fluoride, fuorsilicic acid, fluorine, and other fluorides.

18. The beverage as in claim 3 wherein the tea polyphenols comprises at least one catechin.

19. The beverage as in claim 3 wherein the tea polyphenols comprises at least one theaflavin.

20. The beverage as in claim 3 wherein the tea polyphenols comprises epigallocatechin, epicatechin, epigallocatechin gallate and epicatechin gallate.

21. The beverage as in claim 3 wherein the tea polyphenol comprises gallocatechin or gallocatechin gallate.

* * * * *